US012251588B2

(12) United States Patent
Krutskevych et al.

(10) Patent No.: US 12,251,588 B2
(45) Date of Patent: Mar. 18, 2025

(54) FIRE SYSTEM

(71) Applicant: Marioff Corporation Oy, Vantaa (FI)

(72) Inventors: Nazar Krutskevych, Gdańsk (PL); Piotr Wolnowski, Gdańsk (PL); Pawel Raasz, Gdańsk (PL); Jarmo Helasuo, Vantaa (FI)

(73) Assignee: MARIOFF CORPORATION OY, Vantaa (FI)

( * ) Notice: Subject to any disclaimer, the term of this patent is extended or adjusted under 35 U.S.C. 154(b) by 0 days.

(21) Appl. No.: 17/589,977

(22) Filed: Feb. 1, 2022

(65) Prior Publication Data

US 2022/0241634 A1 Aug. 4, 2022

(30) Foreign Application Priority Data

Feb. 2, 2021 (EP) .................................... 21154746

(51) Int. Cl.

| | |
|---|---|
| ***A62C 37/50*** | (2006.01) |
| ***A62C 35/68*** | (2006.01) |
| ***A62C 37/10*** | (2006.01) |
| *A62C 3/00* | (2006.01) |
| *A62C 3/10* | (2006.01) |

(52) U.S. Cl.

CPC .............. *A62C 37/50* (2013.01); *A62C 35/68* (2013.01); *A62C 37/10* (2013.01); *A62C 3/002* (2013.01); *A62C 3/10* (2013.01)

(58) Field of Classification Search

CPC ......... A62C 37/50; A62C 35/68; A62C 37/10; A62C 3/002; A62C 3/10

USPC ...................... 169/37, 41, 43, 56, 57, 60, 61

See application file for complete search history.

(56) References Cited

U.S. PATENT DOCUMENTS

2018/0200552 A1 7/2018 Wertsberger

FOREIGN PATENT DOCUMENTS

| | | | |
|---|---|---|---|
| EP | 3662976 | A1 | 10/2020 |
| WO | 2019226531 | A1 | 11/2019 |

OTHER PUBLICATIONS

European Search Report for Application No. 21154746.8; Issued Aug. 2, 2021; 10 Pages.

*Primary Examiner* — Christopher S Kim

(74) *Attorney, Agent, or Firm* — CANTOR COLBURN LLP

(57) ABSTRACT

A system includes a fire panel 12 having a loop driver. A combined detection and suppression loop 18 is connected to the loop driver. A plurality of fire detection devices 14 and a plurality of fire suppression devices 19 are coupled to the detection and suppression loop 18. The fire suppression devices 19 includes multiple sprinkler devices 19, each of the sprinkler devices 10 including a sprinkler bulb 100 and a circuit 120. The circuit 120 of the sprinkler device 10 is detectable via the fire panel 12 using the detection and suppression loop 18 in order to provide information from the sprinkler device 19 to the fire panel 12.

18 Claims, 2 Drawing Sheets

FIRE SYSTEM

FOREIGN PRIORITY

This application claims priority to European Patent Application No. 21154746.8, filed Feb. 2, 2021, and all the benefits accruing therefrom under 35 U.S.C. § 119, the contents of which in its entirety are herein incorporated by reference.

TECHNICAL FIELD

The present disclosure relates to a combined fire suppression and detection system as well as to related methods for providing such a system. The invention also relates to a method of operating such a system.

BACKGROUND

Systems (or fire detection systems) are used to identify risk of fires (and also in some cases other emergencies) for a protected location, such as a building or a marine vessel for example, and to alert occupants and/or authorities of such risks. In many cases there is a regulatory requirement for a system to be in place. Typical fire systems include a fire panel connected to a number of indicating devices (e.g. smoke alarms, manual call points) and indicator devices (e.g. sirens, bells, lights, voice messages and so on). The fire panel receives inputs from the indicating devices and determines if an alarm should be sounded. In some cases the fire panel may determine specific actions for different zones of a building depending on the nature of the emergency and the inputs from indicating devices in each of those different zones. The fire panel may also be connected to a communication system, such as via a telephone network, for the purposes of remote monitoring of the protected location and/or for alerting authorities to the presence of a fire. Thus, for example, when a potential fire is detected then the fire panel may sound an alarm to trigger evacuation of the protected location, as well as automatically alerting the emergency services.

Known systems have communication between the fire panel and the remote units via a master-slave communication system using a wired connection typically referred to as a "fire loop" or "detection loop". The communication network thus may include wired links between the fire panel and the remote units, which can be involved in power supply as well as communications. A master interface at the fire panel can receive and broadcast information to the remote units by use of a loop driver. In some cases, wireless communication capabilities are also provided.

In addition to a fire detection system the protected location can be provided with fire suppression devices that can be activated automatically. One example of a fire suppression system is a sprinkler system, which generally includes sprinkler devices arranged to expel fluid for supressing or preventing fire. Sprinkler devices typically include bulbs which are arranged to break at predetermined temperatures and thereby cause the sprinkler to emit the fire suppression fluid. In order to function correctly, the bulb of the sprinkler device 19 must break under prearranged circumstances which occur in the event of a fire. The bulb is therefore a critical component of a sprinkler device 19.

Modern fire suppression systems may be configured to monitor sprinklers e.g. to ensure they are in working order, to track their position for determining the location of a fire etc. Sprinkler devices may therefore be provided with suitable sensors and circuitry installed, and in that case they can be referred to as "smart" sprinklers, for example as discussed in EP 3597274. The known "smart" sprinklers, if using water as the fire suppressant, may be installed on existing water distribution networks or on a newly provided water distribution network.

SUMMARY

Viewed from a first aspect, the invention provides a combined fire suppression and detection system comprising: a fire panel having a loop driver; a combined detection and suppression loop connected to the loop driver of the fire panel; a plurality of fire detection devices that are coupled to the detection and suppression loop; and a plurality of fire suppression devices that are coupled to the detection and suppression loop; wherein the fire suppression devices comprise multiple sprinkler devices, each of the sprinkler devices comprising a sprinkler bulb and a circuit; and wherein the circuit of the sprinkler device is detectable via the fire panel using the detection and suppression loop in order to provide information from the sprinkler device to the fire panel.

With this system the "smart" sprinklers for fire suppression are integrated into a fire detection system on the same loop as other elements such as the detection devices, e.g. smoke or heat alarms. The loop may provide a power and data connection. This enables numerous advantages from pooling of the information provided by the detectors and the sprinklers, for example the use of information from the sprinklers as an added indicator of a possible fire and/or use of the fire panel to determine correct operation and installation of the sprinklers as well as the detection devices. Installation and maintenance actions are consolidated within a combined system with a combined fire panel, and thus for example there may be no need to have separate safety checks on both of a detection loop and a suppression system. Further, via the connections to the loop the fire panel has access to data from circuit of the sprinkler device, which may comprise information for identification of the sprinkler and/or the sprinkler type, information related to operating parameters such as pressure in a bulb of the sprinkler, information relating to the location of the sprinkler device, and/or an indication that the sprinkler has (or has not) been activated.

The circuit of the sprinkler device may for example be a circuit device comprising electronic components for passive and/or active communication with the fire panel. The circuit may comprise a wireless module. The circuit may be arranged to provide information comprising an identification of the sprinkler device to the fire panel, such as one or more of a unique ID, an indication of sprinkler type, an indication of a serial number of product identifier, or any other code or information provided by the manufacturer. In addition or alternatively the information may comprise an indication of the state of the sprinkler and/or a bulb of the sprinkler. It is also possible for the presence/absence of the circuit to be used to provide information, i.e. to indicate the presence/absence of the sprinkler and/or of the sprinkler bulb. In some examples the sprinkler may comprise a mechanically moveable element, such as a seal and/or such as the circuit, wherein activation of the sprinkler results in movement of the moveable element. Optionally this may include ejection of the moveable element from the sprinkler and/or from a bulb thereof, which may occur concurrent with and/or as a result of breaking of the bulb (e.g. due to heat). Some examples, which are discussed further below, involve information from the circuit in the form of pressure data and in relation to the pressure of fluid within the bulb.

The sprinkler bulb may comprise a sealed, frangible housing, and the housing may contain a fluid. The sprinkler bulb may be configured so that the housing breaks when the fluid reaches a predetermined temperature, or when it is subject to a predetermined pressure from the fluid. Thus, the sprinkler bulb may be suitable for use in a conventional sprinkler device and/or fire suppression system or the like. The sprinkler may be operable as a conventional sprinkler bulb. The sprinkler bulb may be arranged so that the housing cracks, bursts, shatters or otherwise breaks under predetermined conditions, for example predetermined conditions indicative of a fire event (e.g. when subject to a predetermined temperature), so that the sprinkler bulb may be used for activating the sprinkler device and/or a fire suppression system when the predetermined conditions are met. The sprinkler bulb may be suitable for preventing release of a fire suppressant or the like from the sprinkler device unless it breaks. For example, the sprinkler bulb may be configured to break, shatter or burst, when its temperature reaches a predetermined threshold. The sprinkler bulb may be arranged so that when it is intact it may support a predetermined mechanical load, e.g. for holding a seal or plug of the sprinkler device in place to prevent release of fire suppressant.

The sprinkler bulb may hold the circuit, e.g. in the form of a circuit device, and the circuit device may comprise an antenna of the sprinkler bulb. The circuit device may comprise a wireless module for communicating with a base station configured to detect pressure changes inside the sprinkler bulb via the wireless module. The base station may be included on the sprinkler device outside of the sprinkler bulb.

The circuit device may be an electronically readable device. The sprinkler device may comprise a reader for reading information from the circuit device, e.g. a reader at the base station. The circuit device may include a radio-frequency identification (RFID). The circuit device may be disposed within the fluid in the bulb, or a housing of the bulb, and may be freely disposed within the fluid. The circuit device may not be attached or otherwise mechanically coupled to the housing. The circuit device may not be tangibly connected to e.g. wires that lead outside the housing. The sprinkler bulb optionally does not comprise any electrical components other than the circuit device.

The circuit device may comprise a plurality of electronic components. The circuit device may comprise a printed circuit board or the like. The circuit device may not interfere with or otherwise affect the function of the sprinkler bulb in breaking under predetermined conditions. The circuit device may have no effect on the mechanical properties of the housing. The circuit device may be entirely within the housing, and may be entirely within an opening or chamber within the housing. The circuit device may be moveable within the housing since it may not be attached or otherwise coupled to the housing.

The circuit device may comprise a wireless module for receiving power, and the wireless module may comprise an antenna. The circuit device may therefore wirelessly receive power from outside the sprinkler and/or from outside the sprinkler bulb. The circuit device may only receive power wirelessly from outside the sprinkler bulb. The sprinkler bulb may therefore be completely sealed and does not require connections, wiring, leads or the like passing into a housing of the bulb, or embedded in the housing. The wireless module may be configured to receive signals, and the circuit device may be controllable via signals received by the wireless module.

The circuit device may be a passive circuit device and may be passive in the sense that it is not able to operate in isolation (e.g. an RFID tag). It may comprise only passive electronic components. The passive circuit device may itself be incapable of controlling current flow therein. The passive circuit device may be configured only to operate in response to external signals and controls e.g. from a further antenna of the sprinkler device and/or from another device such as the fire loop or devices connected thereto.

The wireless module may comprise an inductor and a capacitor. The wireless module may be provided by only the capacitor and the inductor. The inductor and capacitor may be arranged as a resonant circuit, an LC circuit, a tank circuit, a tuned circuit, or the like. The circuit device may therefore be arranged to be powered via the wireless module, without a tangible, solid connection to anything outside the sprinkler bulb.

The circuit device may comprise a power storage device (e.g. a battery, cell or the like) for storing power received via the wireless module. The circuit device may therefore be charged via the wireless module and/or an antenna thereof. The circuit device may be powered wirelessly e.g. from a fire suppression system or the sprinkler device of a fire suppression system.

The circuit device may comprise a heating element operable to heat the fluid. The circuit device may comprise a heating element for heating the fluid within the housing of the sprinkler bulb. The heating element may be operable to heat the fluid within the housing of the sprinkler bulb to thereby increase pressure within the housing. The heating element may be operable to heat the fluid and thereby increase pressure in the housing of the sprinkler bulb and cause the housing to break. The sprinkler bulb may therefore be activated on demand e.g. pre-emptively in the event that a fire is detected by a fire detection device, such as a fire detection device on the combined detection and suppression loop.

The circuit device many comprise a control unit configured to control the circuit device and the components thereof. The circuit device may be operable to activate components of the circuit device as needed. Alternatively, the system may be configured for control of the circuit of the sprinkler via a controller at the fire panel and signals sent therefrom, such as via the combined detection and suppression loop.

Although the circuit device may comprise multiple components, and may be located within the fluid in the housing of the sprinkler bulb, the circuit device may also be only an RFID tag. The RFID tag may be embedded within the bulb, e.g. embedded within the housing of the bulb. That is, the circuit device may not comprise components beyond those required to function as an RFID tag, and may be embedded within the housing of the sprinkler bulb e.g. so that the RFID would not respond to a signal in the event that the sprinkler bulb breaks. The circuit device may comprise a microchip and the microchip may be connected to the antenna. The antenna itself may be embedded within the housing of the bulb. The microchip may be embedded within the housing of the bulb.

The sprinkler device may comprise a mounting adapter arranged to mount the sprinkler device to a surface. The sprinkler device may comprise a sprinkler body mounted to the surface by the mounting adapter. The sprinkler body may hold the sprinkler bulb and a seal for preventing dispersion of fire suppressant while the sprinkler bulb is intact.

The sprinkler device may be configured to detect pressure changes inside the sprinkler bulb using the circuit. The sprinkler device may therefore be used for sprinkler bulb crack detection. The sprinkler bulb may comprise a circuit device, such as that described herein (e.g. a passive circuit device), and the circuit device may comprise a wireless module. The wireless module may comprise an inductor and a capacitor having a capacitance sensitive to pressure changes within the housing of the sprinkler bulb. The sprinkler device (e.g. a controller thereof) may be configured to monitor changes in a resonant frequency of the wireless module caused by changes in the capacitance of the capacitor to thereby detect pressure changes inside the housing of the sprinkler bulb.

The wireless module may be provided by only the capacitor and the inductor. The inductor and capacitor may be arranged as a resonant circuit, an LC circuit, a tank circuit, a tuned circuit, or the like. The wireless module may therefore have a resonant frequency determined by the characteristics of the inductor and the capacitor. The resonant frequency may be determined the inductance of the inductor and the capacitance of the capacitor. However, pressure changes within the housing may affect the structure and dimensions of the capacitor and may thereby cause its capacitance to change. That is, the capacitor may deform under pressure and that deformation may affect its capacitance e.g. by reducing spacing between its conductive elements. Therefore changes in the capacitance of the capacitor may be indicative of pressure changes within the housing e.g. of the fluid contained in the housing. Moreover, a change in the capacitance of the capacitor will cause a change in the resonant frequency of the wireless module. The change in resonant frequency may be proportional to pressure changes in the sprinkler bulb. The sprinkler device may therefore be configured to monitor and/or track changes in the resonant frequency of the wireless module and thereby detect changes in pressure within the sprinkler bulb.

Therefore, during use, pressure changes within the housing of the sprinkler bulb will cause changes in the capacitance of the capacitor, which in turn will cause changes in the resonant frequency of the wireless unit. The sprinkler device and/or the fire panel, receiving information via the detection and suppression loop, may be configured to detect and monitor those changes in the resonant frequency and correlate those changes with pressure changes within the housing of the sprinkler bulb. The sprinkler device may therefore be operable to measure pressure within the sprinkler bulb.

The sprinkler device may comprise a resonance tracking module configured to track changes in the resonant frequency of the wireless module. The circuit device therefore does not need to be a digital device and does not need to comprise a controller, a microprocessor, or the like (i.e. it may be passive).

The capacitor may be any suitable capacitor capable of changing its capacitance in response to changes in ambient pressure. The capacitor may comprise a plurality of conductive layers separated by a predetermined distance, and the capacitor may be arranged to deform under pressure so that the predetermined distance changes. The capacitor may be a standard capacitor, and fundamentally may comprise at least two electrodes held spatially separated from one another. Changes in the predetermined distance between the layers of the capacitor may result in changes of its capacitance. The predetermined distance between layers of the capacitor may be reduced with increasing pressure, and/or may be increased with reducing pressure. The conductive layers may have any topography and may be substantially planar and the predetermined distance between adjacent layers may be substantially constant e.g. at ambient or atmospheric pressure. That is, the conductive layers may be substantially parallel to one another.

The capacitor may take any form so long as its capacitance detectably changes with pressure. The capacitor may be a simple, plain, or common capacitor. That is, the capacitor may not be specifically adapted for use as anything other than a simple capacitor. The capacitor may be suitable for use in a resonant circuit and may not be specifically adapted for use as a pressure sensor. The capacitor may be manufactured and intended for use only as a capacitor. The capacitor may not have a fluid chamber, a diaphragm, or any other cavity or hollow volume for containing fluid. Therefore, the circuit device may be arranged to detect pressure changes within the housing of the sprinkler bulb without the need for specially adapted pressure sensing components. Alternatively, the capacitor may be specially designed for use inside a sprinkler bulb and for use with the devices and methods described herein. The inductor may be any suitable inductor for use in a resonant circuit inside a sprinkler bulb.

The circuit device may be arranged such that all power used thereby is received via the/an antenna. The circuit device may not comprise a battery or other power storage device (e.g. other than the capacitor), and may not be capable of powering itself in the absence of external input. Alternatively, the circuit device may comprise a power storage component for storing energy received by the/an antenna.

As noted above, the circuit device may comprise a heating element for heating fluid within the housing of the sprinkler bulb. Increases in pressure from such heating may cause the capacitance of the capacitor to change, thereby also changing the resonant frequency of the wireless module. The sprinkler device may therefore be configured to test the sprinkler bulb integrity using a method of testing integrity of the sprinkler bulb. The method may comprise monitoring a pressure change within the sprinkler bulb via the wireless module of the circuit device inside the sealed frangible housing of the sprinkler bulb; and determining that the sprinkler bulb is in working order if the pressure reaches a predetermined threshold; or determining that the sprinkler bulb is not in working order if the pressure does not reach the predetermined threshold. Monitoring the pressure change within the sprinkler bulb may comprise monitoring a change in the resonant frequency of the wireless module caused by a change in the capacitance of the capacitor of the wireless module, and may comprise determining the pressure change based upon the change in the resonant frequency. The method may comprise associating a change in the resonant frequency of the wireless module with a change in pressure within the housing of the sprinkler bulb. The method may comprise correlating the change in the resonant frequency with the change in pressure. The change in the capacitance of the capacitor may be caused by a change in pressure within the housing of the sprinkler bulb. The method may therefore comprise determining the integrity of the sprinkler bulb based upon whether or not a resonant frequency of the wireless module changes by more than a predetermined amount. The method may comprise measuring pressure within the sprinkler bulb based upon the resonant frequency. The method may comprise correlating resonant frequencies of the wireless module with pressures inside the sprinkler bulb.

The circuit device may be arranged so that the heating element is activated only upon fulfilment of predetermined conditions e.g. only if a signal received by the wireless module has an amplitude greater than a predetermined threshold. The sprinkler device may therefore be arranged so that the heating element can be activated only when needed by sending a signal to the wireless module e.g. having a large enough amplitude. The circuit device may be configured so that the heating element is not activated if the signal received by the wireless module has an amplitude less than the predetermined threshold. The sprinkler device may therefore be arranged with an architecture for isolating the resonant circuit spectral parameters from undesirable influence by the heating element load by using circuitry arranged to dynamically connect the heating element depending on signal amplitude using only passive electronic components. The sprinkler device may therefore be able to detect that a sprinkler bulb is present, e.g. by eliciting a reaction from the wireless module, without the need to active the heating element.

For example, the passive circuit device may comprise a pair of Zener diodes arranged so that the heating element is activated if the wireless module receives a signal with an amplitude greater than the predetermined threshold. The Zener diodes may be arranged as a voltage switch, and may be disposed in series in opposite orientations. Alternatively, the passive circuit device may comprise a DIAC (diode for alternating current) or other suitable component for activating the heating element upon demand.

The sprinkler device may comprise a device controller configured to test integrity of the sprinkler bulb e.g. by checking for cracks etc. in the housing that would prevent pressure therein reaching a level sufficient to cause the housing to break and thereby activate the sprinkler device. The device controller may not be part of the sprinkler bulb. The device controller may be a part of the fire panel. To test the integrity of the sprinkler bulb, the device controller may send a signal to the circuit device 120 and the circuit device 120 may activate the heating element in response to that signal (e.g. if the signal has a sufficiently large amplitude) and thereby cause pressure within the housing of the sprinkler bulb 100 to increase. The device controller may track resulting changes in the resonant frequency of the wireless module of the passive circuit device. The controller may then correlate a frequency change with a change in pressure, or may correlate a given resonant frequency with a given pressure inside the sprinkler bulb. If the pressure in the sprinkler bulb reaches a predetermined threshold (e.g. slightly less than is needed to break the sprinkler bulb) the device controller may determine that the sprinkler bulb is capable of reaching the pressure needed to break in the event of a fire and hence that the sprinkler bulb is in working order and free of cracks or other flaws that might prevent it actuating in the event of a fire. However, if the pressure does not reach a predetermined threshold, that may be indicative of a flaw in the housing—e.g. a crack or micro crack—preventing the pressure reaching a level necessary for the sprinkler bulb to operate. In that case, the device controller may determine that the sprinkler bulb is not in working order. The sprinkler bulb may therefore be replaced to maintain safety.

The device controller may be configured to regularly test the integrity of the sprinkler bulb, and/or may test the integrity upon command e.g. by a user or another controller such as a fire suppression system controller.

Pressure changes within the sprinkler bulb may be expected to range during use between approximately 0 to 2.5 MPa (0 to 25 bar). The capacitance of the capacitor may vary measurably with the pressure over this range. Therefore the capacitor may be sensitive to pressure changes within the working pressure ranges of the sprinkler bulb.

The combined fire suppression and detection system comprises a fire panel having a loop driver, and the fire panel may have function of a central fire panel for monitoring the protected location and activating an alarm. The plurality of fire detection devices and fire suppression devices that are coupled to the detection and suppression loop may comprise multiple remote units for distribution within the protected location.

The fire detection devices are in communication with the fire panel and may be in a master-slave relationship such that the fire panel will receive inputs from the fire detection devices and may activate an alarm of the protected location when those inputs indicate a possible emergency. The fire suppression devices are in communication with the fire panel and may be in a master-slave relationship such that the fire panel may activate one or more fire suppression devices along with or instead of activating an alarm of the protected location.

The system may include a number of indicating devices on the loop, which may be devices for sensing conditions or for receiving inputs from users. For example the indicating devices may include one or more of: manual call points; smoke detectors; heat detectors; other protected location sensors used for fire or heat detection, such as room thermostats; sensors for supervised doors; sensors for supervised fire extinguishers; water flow sensors; and so on. Input-output modules may be provided for handling information from some types of sensors that may lie outside of the fire system, such as thermostats or water flow sensors. Additionally or alternatively input-output modules may be provided for activating automatic door opening and/or closure systems, or door locking systems. The indicating devices may provide inputs for triggering an alarm condition of the system.

The system may include indicator devices on the loop, which may be devices for indicating an alarm condition of the system, such as audible or visible devices. The indicator devices may include one or more of: sirens; bells; speech sounders; other types of sounders; lights; beacons or remote indicators. The indicator devices may also include one or more transmitter devices for sending alarm notifications to users. Alarm notifications may be sent to local users, for example via wireless transmission of notifications to a mobile device, and/or may be sent to remote users such as protected location management authorities and/or emergency services.

Optionally, some or all of the remote units (i.e. some or all of the fire detection devices and/or the fire suppression devices) may comprise a secondary communication system for communication between remote units in a degraded mode of operation that occurs in the event of a failure of the master-slave communications with the fire panel, the secondary communication system comprising a transceiver arrangement at each remote unit for providing a wireless network between the multiple remote units and/or the fire panel. Advantageously, this wireless network may comprise a wireless mesh network between the multiple remote units. The fire detection devices as well as the fire suppression devices (e.g. the sprinkler devices) may thus communicate with the fire panel and/or with each other via the loop as well as wirelessly.

By introducing a secondary communication network allowing for a wireless network between the remote units then the system may be provided with a degraded mode of operation, where various fire alarm functions may still be provided even after a failure of the master-slave communication system. It will be appreciated that advantages arise when either some or all of the remote units in a system have the transceiver arrangement allowing them to interact via the wireless network. It is not essential that all the remote units have this capability, although it is beneficial. The system may comprise a mixture of remote units (e.g. sprinkler devices) with a transceiver arrangement as described herein, along with remote units (e.g. indicating or indicator units, such as fire detection devices or sounders) without this secondary communication capability.

The wireless network may be provided as a secondary communication system for security and safety purposes, such as by providing redundancy as well as additional communication capabilities. In installations where the master-slave system also provides power to the loop for the detection/suppression devices, the present system may be arranged so that some or all devices on the loop are powered independently of the master-slave system. Thus, they may not rely on a "fire loop" for power or as the sole means of communication, and the wireless network can be fully operative without the fire panel.

The optional secondary communication system comprises a transceiver arrangement at each remote unit, which may be any suitable transmitter and receiver device. The transmitter and receiver can be provided as separate hardware elements, or may be provided by a transceiver element with a combined transmitting and receiving capability, such as by using a single antenna for both transmitting and receiving. In example embodiments the secondary communication system is a Bluetooth network, such as a Bluetooth low energy (BLE) mesh network. This form of network does not rely on a central hub/router and thus can be formed simply via the detection/suppression devices themselves, which may hence each be provided with a suitable Bluetooth transceiver.

The secondary communication system may be capable of communication with an external device, such as communication with computer device, including a mobile device such as a smartphone. It will be appreciated that if a Bluetooth network is used then this may be readily compatible with various computer devices, including smartphone devices. The system may include an app for a computer device to enable users to interact with the fire panel and/or with the detection/suppression devices, such as by using the secondary communication network for communication with the computer device.

The fire detection and suppression system may be for use within a protected location, such as a marine vessel or building, and may be configured for installation in such a protected location, such as with the detection and suppression loop extending between multiple rooms or areas of the ship or building and with fire detection devices and/or fire suppression devices installed within the multiple rooms or areas.

Viewed from a second aspect, the invention provides a marine vessel or a building comprising a fire detection and suppression system as described above, i.e. the system of the first aspect and optionally other additional features as set out above.

It will be appreciated that the system of the first aspect may be supplied in a disassembled form ready for installation within a suitable site, such as a marine vessel or a building. Thus, viewed from third aspect the invention provides a kit of parts for assembly into the fire detection and suppression system described above, the kit of parts comprising at least: a fire panel having a loop driver; cabling and/or connectors for forming a combined detection and suppression loop for connection to the loop driver of the fire panel; a plurality of fire detection devices for coupling to the detection and suppression loop; and a plurality of fire suppression devices for coupling to the detection and suppression loop; wherein the fire suppression devices comprise multiple sprinkler devices, each of the sprinkler devices comprising a sprinkler bulb and a circuit; and wherein the circuit of the sprinkler device is detectable via the fire panel using the detection and suppression loop in order to provide information from the sprinkler device to the fire panel.

The kit of parts may optionally comprise some or all of the additional features discussed above.

Viewed from a fourth aspect, the invention provides a method for providing and/or using a combined fire detection and suppression system, the method comprising: providing a fire panel having a loop driver; providing a combined detection and suppression loop for connection to the loop driver of the fire panel; providing a plurality of fire detection devices for installation coupled to the detection and suppression loop; and providing a plurality of fire suppression devices for installation coupled to the detection and suppression loop; wherein the fire suppression devices comprise multiple sprinkler devices, each of the sprinkler devices comprising a sprinkler bulb and a circuit; and wherein the circuit of the sprinkler device is detectable via the fire panel using the detection and suppression loop in order to provide information from the sprinkler device to the fire panel.

For this method, the providing steps may comprise manufacturing and/or assembling the relevant parts of the system. Alternatively/additionally the providing steps may comprise installing the system, such that the method comprises installing the system with the detection and suppression loop connected to the loop driver, the fire detection devices coupled to the detection and suppression loop, and the fire suppression devices coupled to detection and suppression loop. The method may be for providing the system of the first aspect as well as optionally any of the additional features thereof as set out above.

The method may comprise testing of the system, e.g. directly after an installation process or periodically during use, in order to ensure that the fire detection and/or fire suppression devices are correctly installed and/or are working correctly. For example, the method may comprise using the fire panel to obtain information from the circuits of the sprinkler devices in order to check that the sprinkler devices are correctly installed and/or that installed sprinkler devices are of the correct type. Alternatively or additionally the method may comprise using the fire panel to identify sprinkler devices that have been tampered with or otherwise damaged.

The information provided by the circuit of the sprinkler device may include information indicative of the location of the sprinkler device, such as an identification allowing use of a look-up table, and the method may comprise using the information to indicate the location of a missing sprinkler device or a sprinkler device having a certain status, i.e. activated, broken, being of an incorrect type, being beyond a certain age, and/or other factors linked to correct operation of the sprinkler device and/or the overall system.

The system may be configured to periodically gather information from the sprinkler devices and to store it, e.g. at the fire panel or in a computer device separate to the fire panel. This may allow for a database of current and/or historic information from the sprinklers, enabling easy access for testing as above as well as enabling tracking of parameters of the system, such as tracking of pressure measurements over time at different locations. In one example, the method includes using the information from the sprinkler devices as a way to identify possible leaks in a wet sprinkler system.

Other advantages and capabilities will be evident from the teaching above.

BRIEF DESCRIPTION OF THE DRAWINGS

Certain embodiments will now be described by way of example only and with reference to the accompanying drawings in which.

DETAILED DESCRIPTION

Figure 1:
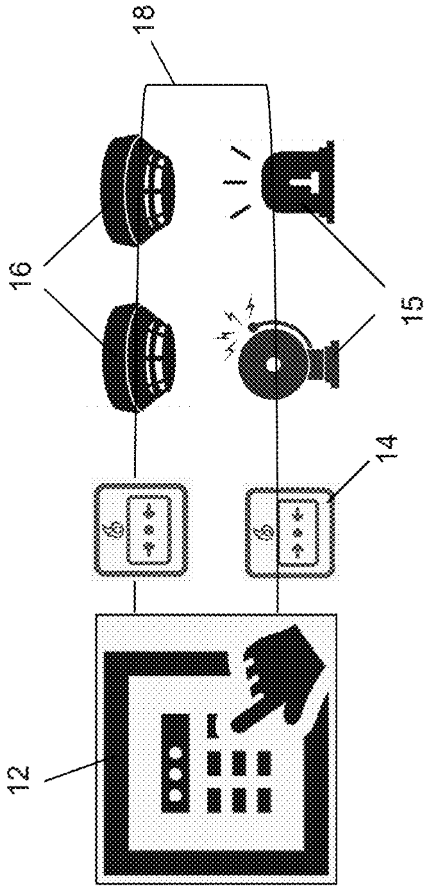
FIG. 1 is a diagram of a fire detection system comprising fire detection devices on a loop.

As seen in FIG. 1 a typical fire system includes a fire panel 12 in communication with multiple remote units 14, 15, 16 in the form of manual call points 14, alert devices 15 such as bells or lights, and smoke and/or fire alarms 16. The manual call points 14 (also known as trigger points) are a form of indicating device. The alert devices 15 are fire detection devices used for alerting users to the existence of an alarm condition. The smoke and/or fire alarms 16 can function as combined indicating and fire detection devices, having a detection capability along with an alarm, such as an audible alarm. The remote units 14, 15, 16 are joined to the fire panel 12 via a master-slave communication system 18, which can be a wired system for data communications as well as providing power to the remote units.

Various types of remote units 14, 15, 16 may be used in the system, as is known in the art, such as devices functioning with one or more capabilities found in manual call points; smoke detectors; heat detectors; other protected location sensors used for fire or heat detection, such as room thermostats; sensors for supervised doors; sensors for supervised fire extinguishers; water flow sensors; sirens; bells; lights; transmitter devices and so on. The system may include input-output modules for handling information from some types of indicating devices that may lie outside of the fire system, such as thermostats or water flow sensors. Additionally or alternatively input-output modules may be provided for activating automatic door opening and/or closure systems, or door locking systems. The remote units may also include fire suppression systems that can be triggered by the system.

Figure 2:
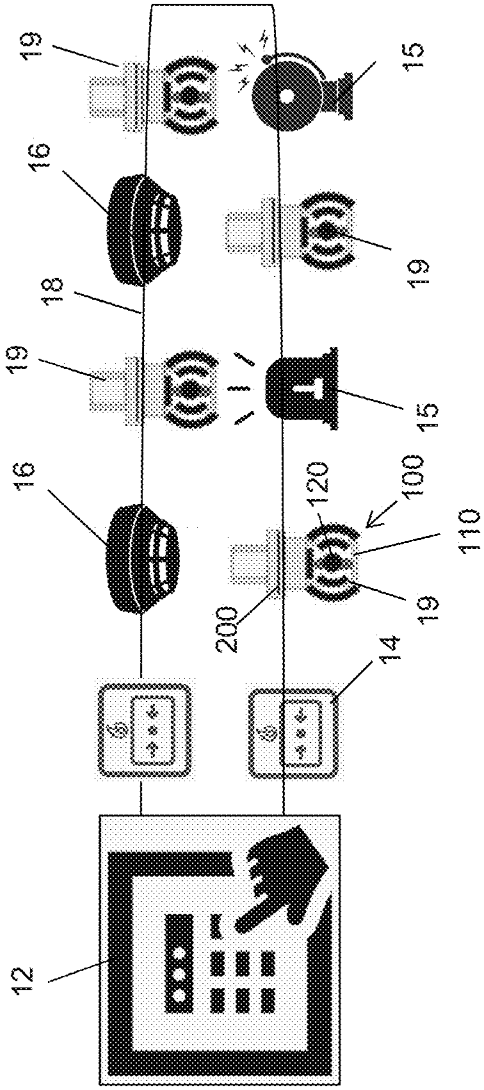
FIG. 2 shows a proposed combined fire detection and suppression system also including sprinkler devices on the same loop as the fire detection devices.

In FIG. 2 the system is enhanced by the addition of sprinkler devices 19, which are "smart" sprinkler devices 19. Each sprinkler device 19 comprises a sprinkler bulb 100 having a sealed frangible housing 110 and a circuit device 120 disposed within the housing 110. The circuit device 120 is therefore sealed inside the housing 110. The housing 110 also contains a liquid as well as a gas bubble of a type known for heat activated sprinklers.

In use, the bulb 100 is located in a sprinkler device 19 and is positioned to hold a seal, plug or the like in place to prevent fire suppression fluid from leaving the sprinkler device 19. The sprinkler bulb 100 is arranged so that it prevents deployment of fire suppressant fluid unless it breaks. In the event of a fire near the sprinkler device 19, the liquid in the housing 110 will be heated and therefore pressure within the housing 110 will increase. Once the liquid reaches a predetermined temperature (e.g. indicative of being near a fire), the resulting pressure from the heated liquid and gas bubble will break the frangible housing 110 and the seal of the sprinkler device 19 will no longer be held in place. Fire suppression fluid will then be discharged from the sprinkler device 19. The housing 110 with its liquid and gas bubble can be configured so that the housing 110 will break under predetermined conditions e.g. when the liquid reaches a predetermined temperature, and hence when the housing 110 is exposed to a predetermined pressure thereby. The housing 110 may be formed of any suitable material, and may be formed of quartzoid.

The sprinkler bulb 100 of the sprinkler devices 19 comprises a circuit device 120 sealed within the housing 110, such as a passive circuit device 120. The circuit device 120 provides information to the fire panel 12, e.g. via the master-slave loop 18. The circuit device 120 in this example comprises a wireless module such as an LC circuit, comprising a capacitor and an inductor. The sprinkler device 19 also comprises a base station 200 arranged to wirelessly supply power to the circuit device 120 and monitor changes in a resonant frequency of the wireless module. The circuit device also comprises a heating element and a pair of Zener diodes arranged as a voltage dependent switch for controlling operation of the heating element.

The resonant frequency of the wireless module is determined by properties of the inductor and capacitor. The circuit device 120 therefore is responsive to signals over a certain bandwidth from an antenna of the base station 200.

The circuit device 120 is disposed within the housing 110. It is necessary for proper operation of the sprinkler bulb 100 that the housing 110 is sealed to prevent any and all leaks (e.g. to prevent ingress of any fluid into the housing 110, and/or prevent egress of any fluid out of the housing 110) otherwise the housing 110 may not break in the event of an emergency, as described above. The circuit device 120 is therefore sealed within the housing 110 and cannot simply be provided with external connections e.g. for power and/or communication.

The example base station 200 comprises a resonance tracking unit for detecting and tracking changes in a resonant frequency of the wireless module of the circuit device 120. It also comprises an antenna for emitting to, and receiving signal from, the wireless module. A power supply is provided to power to the base station 200, and also to power the passive circuit device 120 via interaction of the antenna and wireless module. A communication and integration module is provided to communicate with and integrate into a system architecture comprising e.g. the fire panel 12 and other sprinkler devices 19. A device controller is provided to control operation of the base station 200 and circuit device 120. The device controller may control operation of the sprinkler device 19 autonomously, or may control operation of the sprinkler device 19 under the control of a remote system controller arranged to control e.g. a plurality of sprinkler devices 19 and other devices on the loop 18.

As set out above, the circuit device 120 provides information to the fire panel 12 as well as optionally to other devices, e.g. outside of the system. The information may comprise an identification of the sprinkler device 19 to the fire panel 12, such as one or more of a unique ID, an indication of sprinkler type, an indication of a serial number of product identifier, or any other code or information provided by the manufacturer. In addition or alternatively the information may comprise an indication of the state of the sprinkler and/or a bulb of the sprinkler, for example pressure information as discussed in more detail below. It is also possible for the presence/absence of the circuit 120 to be used to provide information, i.e. to indicate the presence/absence of the sprinkler device 19 and/or of the sprinkler bulb 100.

If the housing 110 of the bulb 100 is damaged, for example by a crack, pressure increases in the liquid inside the housing 110 may be able to normalise with ambient pressure outside the housing 110. For example, liquid may leak out of the housing 110 and/or gas may leak into the housing 110. In that case, pressure within the housing may not reach the level needed to cause the housing 110 to break, and therefore the sprinkler device 19 may not be able to discharge fire suppressing fluid in the event of a fire. Thus, damage to or cracks in the housing 110 can jeopardize operational safety of the sprinkler device 19. Even micro-cracks—which may not be visible to an unaided human eye—can prevent proper functioning of the sprinkler blub 100.

Therefore, known methods of detecting cracks in sprinkler bulbs installed in sprinkler devices 19 in the field—which methods typically involve inspection of the bulbs by eye—may not be sufficient to ensure that a sprinkler device 19 is in working order, and hence may not ensure operational safety of a fire suppression system. Further, such methods are time intensive. Methods which do not involve inspecting bulbs by eye are also known, but are unsuitable for use outside laboratory or factory conditions and with bulbs installed on site, and are typically unsuitable for testing bulbs en mass. Given that sprinkler devices 19 are safety-critical, improvements in regard to testing are desirable.

Using the combined fire detection and suppression system described herein, the housing 110 of the bulb 100 may be tested for cracks using the circuit device 120. The device controller, which may be a part of the fire panel 12, is configured to control operation of the circuit device 120 in order to carry out such a test. Thus, pressure testing to identify damaged bulbs 100 can be done centrally from the fire panel 12, and this may conveniently occur during other tests of the detection devices 16 and so on. In the example arrangement, during a test the device controller (e.g., at the fire panel 12) instructs the antenna of the base station 200 to emit a signal which is received by the wireless module of the circuit device 120. The signal has an amplitude greater than a predetermined threshold and large enough to active the voltage switch provided by the two Zener diodes. The heating element is therefore activated and the liquid within the housing 110 is heated so that pressure inside the sprinkler bulb 100 increases. The resulting pressure increase in the liquid causes the capacitor of the circuit device to deform and hence changes its capacitance.

An example of a standard capacitor for use as the capacitor of the wireless module of the circuit device 120 will now be described. The capacitor comprises a plurality of conductive sheets (i.e. electrodes) separated by a predetermined distance using a dielectric material. An active area of the capacitor is defined by an overlap of the conductive sheets. If the capacitor is subjected to a change in pressure it will deform and the predetermined distance between the conductive sheets will change, thereby changing the capacitance of the capacitor. The greater the change in the predetermined distance, the greater the change in the capacitance. This relationship can be determined theoretically and/or empirically, and therefore the pressure within the housing 110 of the sprinkler bulb is known as a function of capacitance.

The resonant frequency of the LC circuit is a two-variable function of the inductance of the inductor and of the capacitance of the capacitor. However, the inductance of the inductor is substantially insensitive to changes in ambient pressure. As the pressure in the sprinkler bulb 100 increases and the capacitance of the capacitor changes, the resonant frequency of the LC circuit will change correspondingly. The greater the change in pressure, the greater the change in the capacitance and resulting change in the resonant frequency of the wireless module.

Therefore, by being arranged to monitor the resonant frequency of the wireless module, the base station 200 is thereby able to monitor the pressure of the liquid within the housing 110. The base station 200 measures the resonant frequency using the resonance tracking unit and the device controller correlates the resonant frequency with a pressure inside the sprinkler bulb 100. The device controller therefore determines pressure in the sprinkler bulb 100 via the wireless module.

The sprinkler device 19 may therefore measure pressure and/or monitor pressure changes within the housing of the sprinkler bulb 100 where the circuit device 120 is located. The sprinkler device 19 is then also able to test integrity of the sprinkler bulb 100 using the method set out above, and related information can be communicated back to the fire panel 12.

Thus, autonomous, reliable and remote testing of sprinkler bulbs 100 may be accomplished, and may be performed en mass. Bulbs 100 may be checked regularly by a central system, e.g. at the fire panel 12, and faulty bulbs 100 may be flagged for replacement. As set out elsewhere herein the fire panel 12 may also receive other information from the circuit device 120, such as the type of sprinkler and/or its location, amongst other options. The combined fire detection and suppression system therefore gives various advantages by incorporation of smart sprinklers 19 into a detection loop 18.

Figure 3:
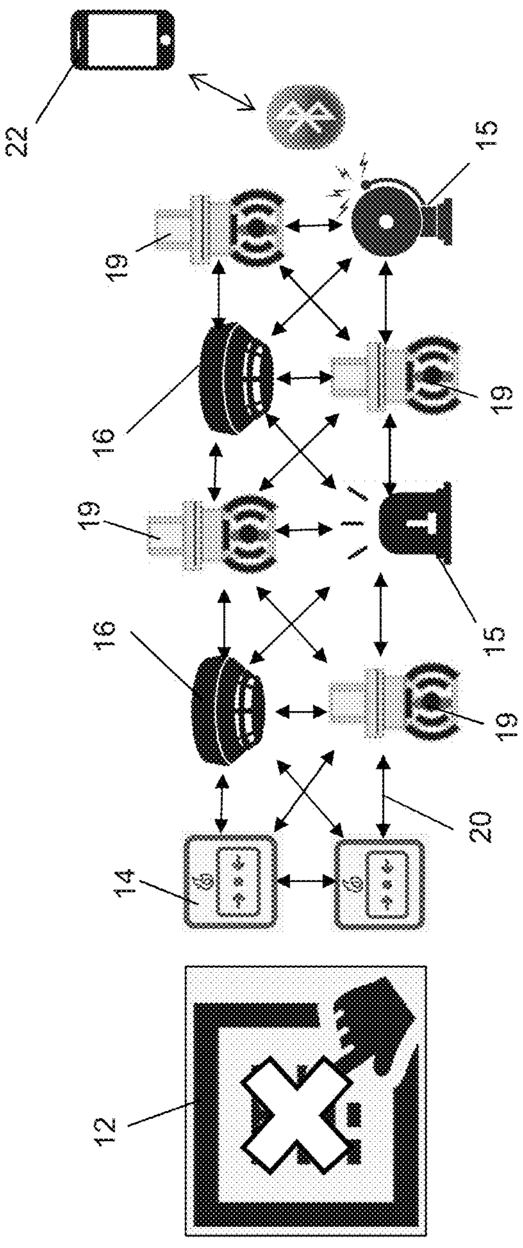
FIG. 3 shows a similar system to FIG. 2 with an optional wireless network capability.

As shown in FIG. 3, a secondary communication system 20 can also be used for the combined fire detection and suppression system, and in this example the secondary communication system 20 is in the form of a Bluetooth mesh network. The secondary communication system 20 is overlaid on the primary communication network, as provided by the master-slave system via loop 18. This gives advantages including the ability to still operate and communicate in a degraded mode in the event of failure of the master-slave communications.

The secondary communication system 20 may also enable communications with an external device 22, such as via a smartphone 22 as shown in FIG. 3, or via some other kind of computer device. This allows for a user to access the secondary communication system 20 upon demand, as well as during the degraded mode. For example, via the smartphone 22 an authorised user may perform maintenance, inspection and/or installation operations, as well as monitoring alarm events and/or controlling the system. This may hence allow for the same testing and maintenance operations that are available via the fire panel 12 to be performed at any location where a device is present with a suitable transceiver, e.g. as may be incorporated within a smart sprinkler device 19.

What is claimed is:

1. A combined fire suppression and detection system comprising:

a fire panel having a loop driver;

a combined detection and suppression loop connected to the loop driver of the fire panel, wherein the combined detection and suppression loop is a closed loop, wherein the closed loop has a first end connected to the loop driver, a plurality of fire detection devices and a plurality of fire suppression devices arranged in series along the loop and a second end connected to the loop driver;

wherein the plurality of fire detection devices are coupled to the detection and suppression loop; and wherein the plurality of fire suppression devices are coupled to the detection and suppression loop;

wherein each of the plurality of fire suppression devices comprises a sprinkler device of a plurality of sprinkler devices, each sprinkler device of the plurality of sprinkler devices comprising a sprinkler bulb and a circuit; and wherein the circuit of each sprinkler device of the plurality of sprinkler devices is detectable via the fire panel using the detection and suppression loop in order to provide information from each sprinkler device of the plurality of sprinkler devices to the fire panel.

2. A combined fire suppression and detection system as claimed in claim 1, wherein the information provided from each sprinkler device of the plurality of sprinkler devices is information for identification of each sprinkler device of the plurality of sprinkler devices information related to operating parameters including a pressure in the sprinkler bulb of each sprinkler device of the plurality of the sprinkler devices, information relating to a location of each sprinkler device of the plurality of sprinkler devices, and/or information giving an indication that a sprinkler device of the plurality of sprinkler devices has been activated or has not been activated.

3. A combined fire suppression and detection system as claimed in claim 1, wherein each circuit comprises a radio-frequency identification, RFID, tag.

4. A combined fire suppression and detection system as claimed in claim 1, wherein the circuit of each sprinkler device of the plurality of sprinkler devices is a circuit device comprising electronic components for communication with the fire panel.

5. A combined fire suppression and detection system as claimed in claim 4, wherein the circuit device comprises a wireless module for receiving power, and the wireless module comprises an antenna.

6. A combined fire suppression and detection system as claimed in claim 5, wherein the wireless module is configured to receive signals, and the circuit device is controllable via signals received by the wireless module.

7. A combined fire suppression and detection system as claimed in claim 5, wherein the wireless module is for communicating with a base station of each sprinkler device of the plurality of sprinkler devices.

8. A combined fire suppression and detection system as claimed in claim 5, wherein the wireless module comprises an inductor and a capacitor, and wherein the capacitor is capable of changing its capacitance in response to changes in an ambient pressure.

9. A combined fire suppression and detection system as claimed in claim 1, wherein one or more of the plurality of fire detection devices and/or one or more of the plurality of the fire suppression devices comprise a secondary communication system for communication in a degraded mode of operation that occurs in an event of a failure of communications with the fire panel via the combined detection and suppression loop and loop driver, the secondary communication system comprising a transceiver arrangement at each of said one or more of the plurality of fire detection devices and/or said one or more of the plurality of fire suppression devices for providing a wireless network between said one or more of the plurality of fire detection devices and/or said one or more of the plurality of the fire suppression devices and/or the fire panel.

10. A combined fire suppression and detection system as claimed in claim 9, wherein the wireless network comprises a wireless mesh network.

11. A marine vessel or a building comprising a fire detection and suppression system as claimed in claim 1.

12. A kit of parts for assembly into the fire detection and suppression system as claimed in claim 1, the kit of parts comprising at least: the fire panel having the loop driver; a cabling and/or connectors for forming the combined detection and suppression loop for connection to the loop driver of the fire panel; the plurality of fire detection devices for coupling to the detection and suppression loop; and the plurality of fire suppression devices for coupling to the detection and suppression loop.

13. A method for providing a combined fire detection and suppression system as claimed in claim 1, the method comprising:

providing the fire panel having the loop driver;

providing the combined detection and suppression loop for connection to the loop driver of the fire panel;

providing the plurality of fire detection devices for installation coupled to the detection and suppression loop; and providing the plurality of fire suppression devices for installation coupled to the detection and suppression loop.

14. A method as claimed in claim 13 comprising testing of the system in order to ensure that the plurality of fire suppression devices are correctly installed and/or are working correctly by the fire panel obtaining information from the circuits of the plurality of sprinkler devices in order to check that the plurality of sprinkler devices are correctly installed and/or to identify one more of the plurality of sprinkler devices that have been tampered with or otherwise damaged.

15. A method as claimed in claim 13, comprising determining a location of a missing sprinkler device of the plurality of sprinkler devices or a status of each sprinkler device of the plurality of sprinkler devices in response to information provided from each sprinkler device of the plurality of sprinkler devices to the fire panel.

16. A combined fire suppression and detection system as claimed in claim 1, wherein the plurality of fire detection devices and the plurality of fire suppression devices are separate devices.

17. A combined fire suppression and detection system as claimed in claim 1, wherein the fire panel and the plurality of fire detection devices are configured in a master-slave relationship, such that the fire panel receives inputs from the plurality of fire detection devices and activates an alarm of a protected location when the inputs indicate an emergency.

18. A combined fire suppression and detection system as claimed in claim 1, wherein the fire panel and the plurality of fire suppression devices are configured in a master-slave relationship, such that the fire panel activates one or more of the plurality of fire suppression devices along with or instead of activating an alarm of a protected location.

* * * * *